United States Patent
Hope et al.

[11] Patent Number: 5,422,200
[45] Date of Patent: Jun. 6, 1995

[54] BATTERY PACKAGING CONSTRUCTION FOR ALKALI METAL MULTICELL BATTERIES

[76] Inventors: Stephen F. Hope; Joseph B. Kejha, both of 3701 Welsh Rd., Willow Grove, Pa. 19090-1293

[21] Appl. No.: 281,014
[22] Filed: Jul. 27, 1994
[51] Int. Cl.⁶ .............................................. H01M 6/46
[52] U.S. Cl. .................................... 429/157; 429/159; 429/163
[58] Field of Search ........ 429/149, 152, 153, 156–160, 429/162, 163

[56] References Cited

U.S. PATENT DOCUMENTS

| | | | |
|---|---|---|---|
| 2,632,784 | 3/1953 | Marsal et al. | 429/157 |
| 3,708,340 | 1/1973 | Tamminen | 429/157 X |
| 4,374,186 | 2/1983 | McCartney et al. | 429/154 |
| 4,409,304 | 10/1983 | Gerard et al. | 429/158 |
| 4,518,665 | 5/1985 | Fujita et al. | 429/153 |
| 4,816,354 | 3/1989 | Tamminen | 429/162 |

*Primary Examiner*—Anthony Skapars
*Attorney, Agent, or Firm*—Z. T. Wobensmith, III

[57] ABSTRACT

Battery packaging construction for multiple cell alkali metal batteries wherein a plurality of flat or cubic battery cells, which have leads extending therefrom, are individually packaged by using layers of heat sealed or adhesively sealed plastic tape. The cells after assembly are stacked and the leads are electrically connected in series or parallel to terminals, and are secured by a band of tape, or glued together, and then enclosed in a plastic coated metal foil bag, heat sealed and adhesive sealed for moisture-proofing. The bag is placed in a hard box which is then closed to form the completed battery with the terminals extending therefrom. The hard box may optionally be provided with a liner of vibration and impact shock absorbing material.

15 Claims, 1 Drawing Sheet

BATTERY PACKAGING CONSTRUCTION FOR ALKALI METAL MULTICELL BATTERIES

BACKGROUND OF THE INVENTION

1. Field of the Invention

Battery packaging construction for multicelled flat or cubic alkali metal batteries wherein a plurality of cells are individually packaged in horizontal layers of electrically insulating material, with leads from the cells connected in series or parallel to terminals, the packaged cells are stacked and placed in a moisture proof bag, which is heat sealed and the bag placed in a hard box, from which the terminals extend.

2. Description of the Prior Art

While there are many different types of battery packaging arrangements for single celled batteries, none of them are satisfactory for multicelled batteries, which batteries are required for many applications and must satisfy various criteria.

Examples of prior art patents are the U.S. Patents to Coleman et. al. U.S. Pat. Nos. 2,632,782; Nowotny 2,798,895; Ikeda et. al. 4,371,597; Tamminem 4,816,354; and the United Kingdom Patent to Pearson No. 2087636.

The U.S. Pat. No. to Nowotny, 2,798,895 discloses a point contact battery of the zinc LecLanche dry cell flat type wherein the cell components are sealed within a pair of plastic sheets. A collector plate is provided which makes electrical contact within the cell and has a plurality of sharp projections projecting from the plate and through the outer cell covering.

The British patent to Pearson, No. GB 2087636A discloses a recombinant lead acid battery with two or more cell packs comprised of positive and negative electrodes interleaved with glass fiber separators, each cell pack enclosed in a plastic bag and all the cell packs are sealed in a common outer plastic bag, which has a one way vent. The whole assembly is enclosed in a fold up outer casing.

None of the patents have cells which include leads which are electrically connected together by electrically conducting adhesive or tape, and none of the prior art patents disclose structure that would provide adequate protection from moisture in an alkaline metal or alkaline earth metal battery. None of the prior art patents includes a bag constructed of metallic foil, coated with a heat sealable plastic, which encloses the cells.

Multicelled batteries are usually packaged in a welded outer shell of metal, such as stainless steel, with the individual cells separated by layers of loose sheets of insulating material, such as oiled paper or plastic. While such construction may be satisfactory for many battery applications, it is heavy, expensive, does not adequately protect the cells, is difficult to handle and suffers from other shortcomings. The battery packaging construction of the invention does not suffer from the prior art problems and provides many positive advantages.

SUMMARY OF THE INVENTION

This invention relates to battery packaging construction for multicelled flat or cubic batteries, which construction includes assembling each cell as an individual moisture proof and electrically insulated packaged unit for safety and handling ease, and then stacking and electrically connecting leads from the multiple cells to terminals in series or parallel, by cold soldering, or by electrically conductive tape or adhesive, securing the stack together, sealing the stack of cells in a moisture proof bag, and placing the assembly in a hard box container from which the terminals extend. The container may optionally be provided with an impact and vibration absorbing liner.

The principal object of the invention is to provide battery packaging construction for multicelled batteries which provides a moistureproof, durable, and lightweight product.

A further object of the invention is to provide battery packaging construction for multicelled batteries which is inexpensive and adaptable to mass production.

A further object of the invention is to provide battery packaging construction for multicelled batteries which is particularly suitable for alkali metal and alkaline earth metal batteries.

A further object of the invention is to provide battery packaging construction for multicelled batteries which can accommodate a large number of cells in a compact durable product.

A further object of the invention is to provide battery packaging construction for multicelled batteries which provides impact and vibration protection to the cells.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part hereof in which.

It should, of course, be understood that the description and drawings herein are merely illustrative and that various modifications and changes can be made in the structures disclosed without departing from the spirit of the invention.

Like numerals refer to like parts throughout the several views.

DESCRIPTION OF THE PREFERRED EMBODIMENT

Figure 1:
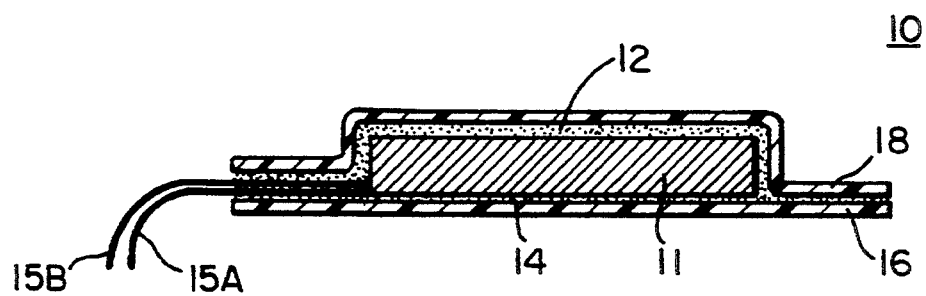
FIG. 1 is a side elevational view, in partial section, of one cell of a battery to be incorporated in the packaging construction of the invention.

Referring now more particularly to the drawings, and FIG. 1 thereof, a single cell 10 is therein illustrated which may be of the alkali metal-polymer, or alkaline earth metal-polymer type and preferably of the lithium-polymer type. The cell 10 includes an anode, cathode and electrolyte layers (not shown) and has been assembled into a solid block 11, which may be of rectangular configuration, with flat top and bottom surfaces 12 and 14, with leads 15A and 15B extending therefrom and preferably formed of flat nickel metal foil.

The bottom surface 14 of block 11 rests on a base layer 16, which may be of anhydrous electrically insulating plastic tape of well known type. The tape 16 may be provided with an adhesive coating (not shown) or may have heat sealing properties. The block 11 has a top layer of tape 18 on its top surface 12, which tape may be adhesively coated or heat sealable as described for base tape 16. The tapes 16 and 18 may be continuous and serve as a carrier of electrodes and cells for mass production. The leads 15A and 15B are connected respectively to the anode and cathode (not shown) and extend between the base layer 16 and top layer 18. The assembly of cell 10 as described above is done in an inert dry atmosphere, or under vacuum conditions in order to avoid contamination, corrosion or deterioration due to the characteristics of the cell components.

Figure 2:
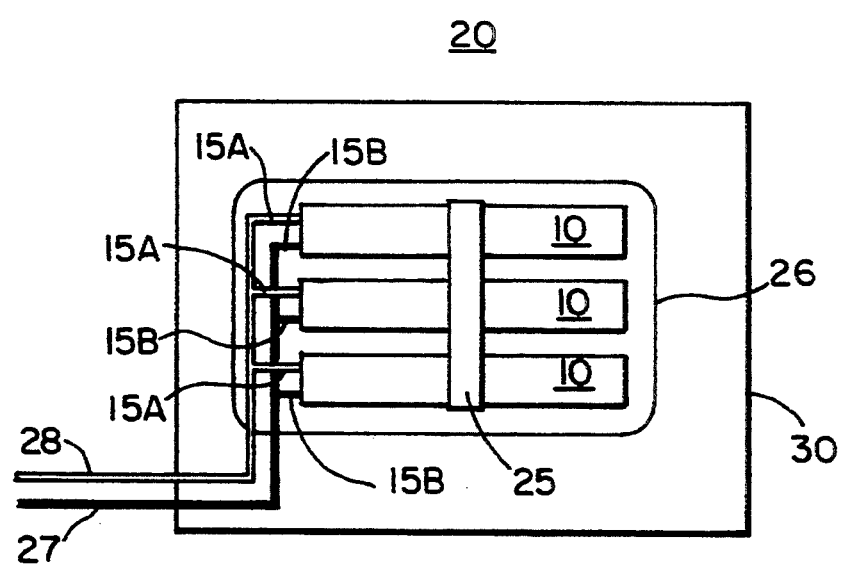
FIG. 2 is a side elevational view, in partial section, illustrating a plurality of cells assembled into the battery product.

Referring now additionally to FIG. 2 of the drawings, a battery 20 which is constructed of a plurality of cells 10 is illustrated, with the completed cells 10 stacked on top of each other, and with leads 15A and 15B from the cells 10 electrically connected together in series or parallel, by cold soldering, (pressing) using a soft metal foil such as lithium metal, or by electrically conductive tape or adhesive, or adhesive transfer tape of well known type (not shown). The stack of cells 10 is held together with at least one band of tape 25 or by an adhesive layer (not shown) between them upon which the cells may be placed during mass production. The stack of cells 10 is then enclosed in a moisture proof bag 26 under moisture free and inert atmosphere conditions, which bag is preferably of metallic foil such as aluminum or other suitable metal which is coated with a heat sealable plastic, and preferably polyethylene. The leads 15A and 15B from cells 10 are connected to terminals 27 and 28 by cold soldering a soft metal such as lithium foil or by electrically conductive adhesive tape of well known type (not shown). The bag 26, with terminals 27 and 28 which exit therefrom is heat sealed, preferably under vacuum, or in an moisture free and inert atmosphere, and sealed by epoxy or acrylic based cement or resin (not shown) of well known type. The bag 26 and assembled cells 10 are placed in a hard box 30, which may be of plastic, fibre reinforced honeycomb sandwich board, or magnesium or aluminum metal, and which provides punch protection to the structure. Terminals 27 and 28 which are electrically insulated also extend through the box 30.

The hard box 30 described above may be lined on the inside with an adhesively secured layer (not shown) of a soft, compressible impact and vibration energy absorbing liner material of well known type, to protect the cells 10 from shock and vibration.

Preferred liner materials are Isoloss foam, and Isodamp sheets as manufactured by Ear Specialty Composites Co.

The liner material not only provides impact and shock protection, but also provides for cell expansion during cycling.

It will thus be seen that battery packaging construction has been provided with which the objects of the invention are achieved.

We claim:

1. Battery packaging construction for packaging multicell alkali metal or alkaline earth metal batteries which comprises
   a plurality of battery cells in stacked configuration, said cells each having
   a base layer of electrically insulating tape,
   a battery cell on said base layer,
   a top layer of electrically insulating tape on said cell extending over and in contact with said tape base layer,
   leads extending from each of said cells between said tapes and therefrom and electrically connected in series or parallel to the leads of another cell,
   a moisture proof bag enclosing said stack of cells in sealed relationship,
   terminals connected to said cell leads and extending from said bag, and
   a hard box enclosing said bag, with said terminals extending from said box.

2. Battery packaging construction as defined in claim 1 in which
   said base tape and said top tape layers are of plastic coated with adhesive, which adhesive faces said cell.

3. Battery packaging construction as defined in claim 1 in which
   said base tape and said top tape layers are of heat sealable plastic.

4. Battery packaging construction as defined in claim 2 in which
   said adhesive and said plastic are anhydrous.

5. Battery packaging construction as defined in claim 3 in which
   said plastic is anhydrous.

6. Battery packaging construction as defined in claim 1 in which
   said leads and said terminals are electrically connected by cold soldering.

7. Battery packaging construction as defined in claim 1 in which
   said leads and said terminals are electrically connected by electrically conductive adhesive transfer tape.

8. Battery packaging construction as defined in claim 6 in which
   said cold soldering material is lithium.

9. Battery packaging construction as defined in claim 1 in which
   said base layer and/or said top layers of electrically insulated tapes are continuous and used as a carrier of individual cells during mass production.

10. Battery packaging construction as defined in claim 1 in which
    said hard box is lined with a layer of vibration, and shock absorbing material.

11. Battery packaging construction as defined in claim 1 in which
    said plurality of cells are retained in stacked configuration by layers of adhesive between said cells.

12. Battery packaging construction as defined in claim 1 in which
    said plurality of cells are retained in stacked configuration by at least one band of tape.

13. Battery packaging construction as defined in claim 1 in which
    said leads and said terminals are electrically connected by an electrically conductive adhesive.

14. Battery packaging construction as defined in claim 1 in which
    said terminals and said leads are held together and electrically connected by a length of tape.

15. Battery packaging construction as defined in claim 1 in which
    said leads are of nickel foil.

* * * * *